United States Patent Office 3,286,144
Patented Nov. 15, 1966

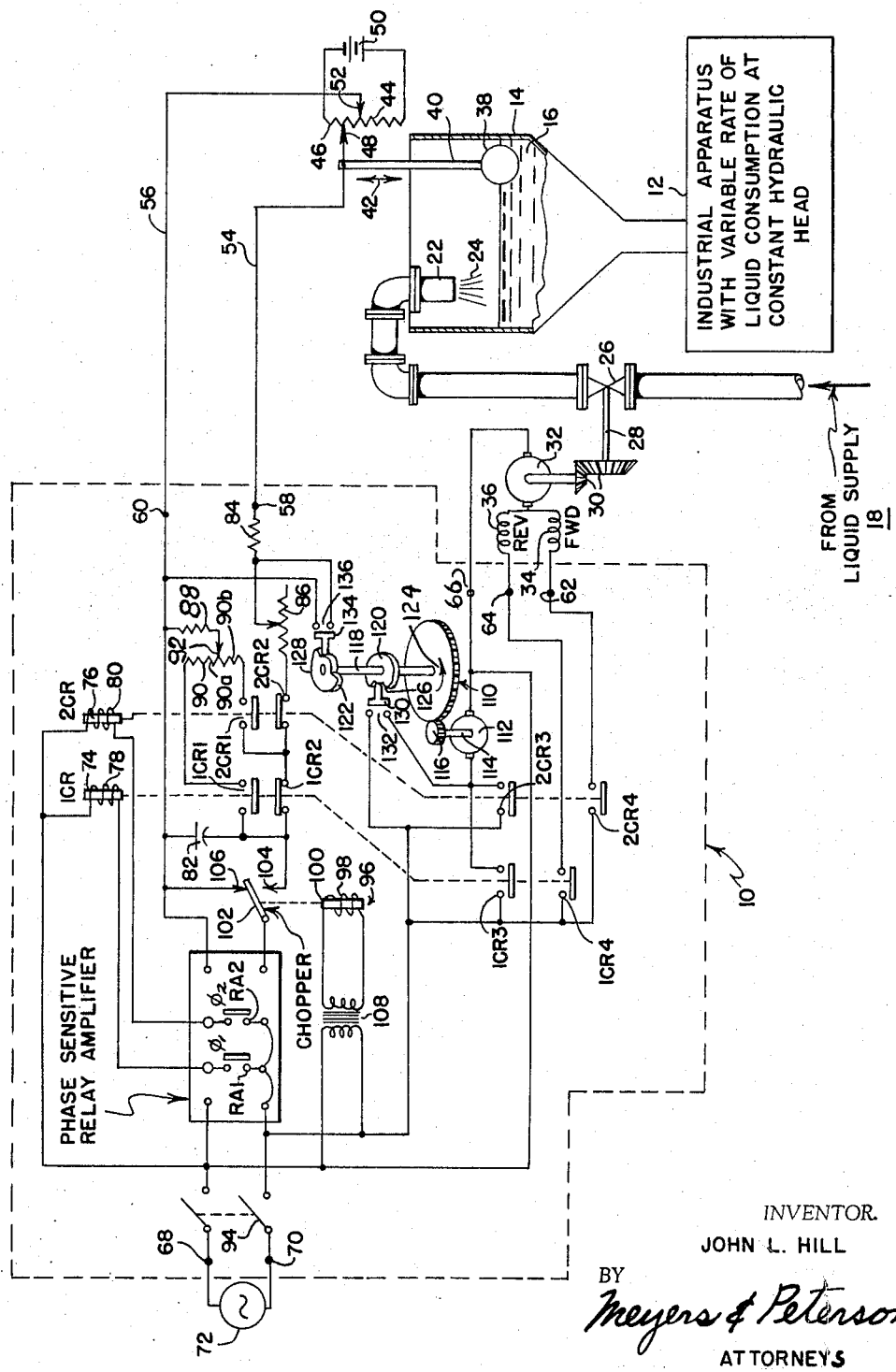

3,286,144
ON-OFF INTEGRATING MOTOR CONTROLLER
John L. Hill, St. Paul, Minn., assignor to Ramsey Engineering Company, St. Paul, Minn., a corporation of Minnesota
Filed Nov. 6, 1963, Ser. No. 321,870
10 Claims. (Cl. 318—18)

This invention relates generally to controllers for maintaining a substantially constant or stable operating condition in various types of industrial processes by initiating a corrective action when a measurement of a process parameter indicates and produces an appropriate error signal, and pertains more particularly to a controller for use with processes in which the result of the corrective action is not instantaneous and therefore not immediately apparent or detectable. Although not limited thereto, some of the industrial processes having an appreciable time delay therein between the initiation of a controlled action and the determination of the result thereof are in conjunction with the control of pH, electrical conductivity, heat, flow, pressure, and humidity.

Accordingly, one object of the present invention is to minimize the degree of "over control" in various industrial processes involving a delay between the controlled action and the effect thereof at the point of measurement.

Another object of the invention is to provide a controller usable in conjunction with industrial processes of the above-mentioned type and those similar thereto in which the control action is in accordance with the magnitude and duration of the deviation or error. In other words, if the error is great, a controller of the envisaged type will effect a larger correction in a given period of time than when the error is only small or less significant.

A further object of the invention is to provide a controller that will substantially reduce the amount of spurious control actions that would otherwise be caused by "noise" or random fluctuations in the measurement. Stated somewhat differently, noise signals will in most instances cancel out in relatively short periods of time and the present controller permits this to happen with the consequence that the corrective action is based solely upon the actual need for correction.

Yet another object of the invention is to provide a controller of the foregoing character that will be bidirectional in that it will provide corrective action to either cause an increase or decrease of the condition being controlled.

A still further object of the invention is to provide a controller that will be relatively inexpensive and which will not require any great amount of maintenance.

The invention also has an additional object the provision of a controller that is quite versatile inasmuch as it can be readily installed in conjunction with various types of industrial processes and which can be modified or adjusted for different operating conditions with respect to a particular process.

Quite briefly, the invention involves the integrating of a voltage or current signal that is representative of the error or deviation that requires correction. When the integral of the error signal reaches a predetermined value, then a pre-established amount of corrective action is initiated during which the integration process is automatically discontinued. Also occurring simultaneously with the foregoing is the starting of a time delay period which prevents too frequent repetition of the corrective action until a predetermined time has elapsed. Each increment of corrective action takes place during a time interval shorter than the time delay period.

These and other objects and advantages of my invention will more fully appear from the following description, made in connection with the accompanying drawing in which:

The single figure that has been selected for exemplifying the invention consists of a schematic circuit shown in association with a diagrammatically depicted industrial process of a rather simple type.

Referring now in detail to the drawing, the controller illustrating my invention has been denoted generally by the reference numeral 10. Before describing the components constituting the illustrative controller, it will be of assistance to describe the industrial process with which the controller is pictured. Therefore, the industrial apparatus that is to be considered as having a variable rate of liquid consumption has been designated in block form and has been identified by the reference numeral 12. It will be assumed that the hypothetical industrial process requires a substantially constant head of liquid, which may be water or some form of chemical that is to be consumed in practicing the process. Accordingly, a tank 14 is pictured and its outlet is connected to the apparatus 12. The liquid within the tank that is to be maintained at a substantially constant level in order to provide the uniform head has been identified by the reference numeral 16. A liquid supply or source 18 provides the liquid that is to be fed to the apparatus 12 from the tank 14 and this liquid passes through a flow line 22 and is discharged into the tank 14 in the form of a stream labeled 24. For the purpose of maintaining the level of the liquid 16 at a substantially uniform height, a regulating valve 26 is installed in the flow line 22 and its valve stem 28 is rotated via a pair of bevel gears 30 by a reversible motor 32. For the sake of simplicity, it will be assumed that the motor 32 is rendered reversible by reason of a pair of windings 34 and 36, the energization of one such winding causing rotation of the motor in one direction and energization of the other causing rotation of the motor in a reverse direction. Consequently, the valve stem 28 can be rotated in either direction to increase or decrease the flow of liquid through the line 22.

In order to sense the level of the liquid 16, a float 38 is placed in the liquid and a rod or staff 40 extends upwardly through the top of the tank 14. Thus, the rod or staff 40 moves upwardly or downwardly as indicated by the double headed arrow 42.

For the purpose of providing an appropriate error signal that is representative of the level of the liquid 16, a potentiometer 44 is utilized in the illustrative instance. The potentiometer 44 conventionally includes a resistance 46 and a wiper or slidable contact 48, the contact 48 being carried adjacent the upper end of the staff or rod 40. A D.-C. supply 50 in the form of a battery is connected across the upper and lower ends of the resistance 46. A tap 52 is adjustable along the resistance 46 and for the sake of discussion such tap or contact 52 may be assumed to be midway between the ends of the resistance 46 so that an error signal is produced whenever the movable contact 48 is shifted by float 38 away from its central or midway position.

A pair of conductors 54, 56 extends from the contacts 48, 52 to a pair of terminals 58, 60 on the controller 10. A trio of terminals 62, 64 and 66 serve as the terminals for the motor 32, the windings 34 and 36 being connected to the terminals 62 and 64 whereas the terminal 66 is connected to the side of the motor 32 opposite from the side to which the windings 34, 36 are connected. A pair of power supply terminals 68, 70 are also provided, these terminals being connected to an alternating current source labeled 72.

Describing now the components constituting the controller 10, attention is first called to a pair of relays designated generally as 1CR and 2CR. The relay 1CR is equipped with a set of normally open contacts 1CR1, a set of normally closed contacts 1CR2, a set of normally open contacts 1CR3 and a further set of normally open contacts 1CR4. Likewise, the relay 2CR has a set of normally open contacts 2CR1, a set of normally closed contacts 2CR2, a set of normally open contacts 2CR3, and a further set of normally open contacts 2CR4. The relays 1CR and 2CR have armatures identified by the reference numerals 74, 76 and operating coils 78, 80, respectively. The manner in which the operating coils 78 and 80 are energized will be better understood after additional components are referred to.

At this time, attention is drawn to the presence of a capacitor 82 disposed in a D.-C. charging and discharging circuit. The circuit for charging the capacitor includes a fixed resistor 84 and an adjustable resistor 86, these resistors being in series with the normally closed contacts 1CR2 and 2CR2. In other words, an electrical path exists through the mentioned components from the terminals 58, 60. Thus, it will be discerned that a charging current will flow in the capacitor 82 in proportion to the error voltage signal provided by the potentiometer 44; however, as will later be shown, this current will typically be interrupted before the capacitor attains more than a small fraction of the error voltage.

For the purpose of providing a discharge path for the capacitor 82, it will be seen that a resistor 88 is employed and that it is connected to a resistor 90 through the agency of a slidable contact 92, thereby dividing the resistor 90 into two portions labeled 90a and 90b, the particular value of each portion 90a and 90b being determined by the position of the contact 92. Thus, an electrical path can be traced from the capacitor 82, when discharging, through the resistor 88, the portion 90a and the normally open contacts 1CR1 (when the relay 1CR is energized). On the other hand, a discharge path can be traced through the resistor 88, the portion 90b, the normally open contacts 2CR1 (when the relay 2CR is energized) and the normally closed contacts 1CR2. In other words, two discharge paths are available depending upon whether the relay 1CR or the relay 2CR is energized.

Because the error signal applied to the terminals 58, 60 can be either positive or negative, it is necessary that the polarity of the charged state of the capacitor 82 be determined. This is done by a phase sensitive relay amplifier RA, such as Model 7084A manufactured by Minneapolis-Honeywell. It can be seen that the relay amplifier RA is energized from the terminals 68, 70 via the switch 94 which is closable to complete a circuit to the source 72. Inasmuch as the relay amplifier RA is of conventional design, a detailed description thereof is not necessary. However, it will be helpful to an understanding of what occurs to show a pair of normally open sets of contacts RA1 and RA2, either of which sets is closed when the capacitor 82 becomes sufficiently charged, the particular set of contacts RA1 or RA2 that is closed depending upon the polarity of the capacitor voltage.

In order to provide the proper input for the relay amplifier RA, a chopper denoted generally by the reference numeral 96 is employed. The chopper 96, which is also conventional, includes an operating coil 98 and a reciprocable armature 100 that is connected to a movable contact 102. Movable contact 102 is, therefore, oscillated or swung back and forth between a pair of fixed contacts 104, 106. The chopper 96 is connected through the agency of a transformer 108 to the A.C. power terminals 68, 70 that have already been mentioned. It is the polarity of the capacitor voltage in combination with the synchronous movement of the chopper armature 102 that determines the phase of the resulting square wave that is thus delivered to the relay amplifier RA. Even though the square wave input voltages impressed on the relay amplifier RA are instrumental in determining which set of contacts RA1 or RA2 will be closed, the closure is, of course, dependent upon the voltage of the capacitor 82 being sufficient to cause such closure. In other words, if the capacitor 82 has not become charged to the proper state or level, neither set of contacts RA1 or RA2 will be picked up or closed. The circuit constants are chosen so that the capacitor voltage at which the contacts are operated is considerably smaller, approximately one-tenth, of the smallest significant error voltage impressed across terminals 58 and 60.

If the contacts RA1 are closed, then the operating coil 78 of the relay 1CR will become energized and will cause the normally open contacts 1CR4 to close and thus energize the winding 34 of the motor 32 to cause the motor to rotate in one direction. On the other hand, if the contacts RA2 are closed, then the operating coil 80 of the relay 2CR will be energized to cause the normally open contacts 2CR4 to close with the consequence that the winding 36 of the motor 32 will be energized and the motor will rotate in a reverse direction.

At the same time, as will be better understood from an operational sequence hereinafter given, a discharging of the capacitor 82 is begun and the time taken for the capacitor 82 to discharge will determine the length of time that the motor 32 runs each time that the predetermined level of charge has been reached with respect to the capacitor.

Reference will now be made to a time delay unit designated generally by the reference numeral 110. This unit 110 includes a motor 112 that is initially energized through either the contacts 1CR3 or 2CR3, depending upon which relay 1CR or 2CR is energized. The motor 112 drives a shaft 114 which is coupled to a replaceable gear box 116. As will presently be made manifest, the selection of the gear ratio of the gears contained within the gear box 116 can be utilized in the providing of the time delay that elapses before the charging of the capacitor 82 can again occur. This delay is on a much longer time cycle than the integration cycle. The time delay unit 110 further comprises a cam shaft 118 that is connected to the gear box 116 and the cam shaft has mounted thereon first and second cams 120 and 122 which are rotatable in the direction of the arrow 124. It will be observed that the cam 120 has a relatively narrow notch at 126 which extends only a fraction of the periphery of this particular cam, whereas the cam 122 has an arcuate notch 128 that is considerably longer. In other words, the notch 126 subtends a comparatively small angle with respect to the notch 128 for a purpose presently made clearer. Still further, the unit 110 additionally includes a first plunger 130 that bears or rides against the cam 120, being urged into engagement with a normally open set of contacts 132 when the unnotched periphery of the cam 120 causes the plunger 130 to be moved outwardly. Similarly, a second plunger 134 is cooperable with the cam 122, being forced outwardly to close a set of normally open contacts 136 when the unnotched periphery of the cam 122 is rotated into juxta-position with respect to said plunger 134. The contacts 132, it might be mentioned, are in a parallel relationship with the contacts 1CR3 and 2CR3 and serve to seal in the motor 112 after it has begun rotating. On the other hand, the contacts 136 are connected directly across the error circuit and when closed prevent any further charging of the capacitor 82 as long as they remain closed. However, by adjustment of the amount of notched periphery of cam 122, additional time of error integration may be permitted before contacts 136 are closed. In the presence of large error voltages, more than one charge and discharge sequence may thus be permitted to occur during each cycle of time 110.

The foregoing description is believed sufficient to permit only a brief reference to a typical operational sequence. Assuming that the industrial apparatus 12 requires more liquid, the level of the liquid 16 will be lowered with the consequence that the float 38 will be lowered. The lowering of the float 38 causes the slider contact 48 to move downwardly with the result that the terminal 58 becomes increasingly more negative with respect to the terminal 60. At this stage of the operation, the contacts 136 are open, so a charging path exists through the resistors 84, 86 and the contacts 1CR2 and 2CR2. Because the terminal 58 is rendered more negative, the capacitor 82 will be charged in a direction such that the lower electrode thereof will become increasingly more negative than the upper electrode. If the error signal impressed across the terminals 58, 60 is relatively small, then it will take a considerably longer time for the capacitor 82 to become charged to a predetermined state or level, whereas if the potential between the terminals 58, 60 is quite large then the larger charging current will cause the predetermined state of charge to be reached sooner.

Owing to the presence of the chopper 96, however, the degree of charge on the capacitor 82 is repeatedly sampled and when it becomes great enough, that is, to reach the desired predetermined level, then the contacts RA1 will become closed and the relay 1CR energized. It has already been stated that the phase sensitive relay amplifier causes closure of either the contacts RA1 or RA2 depending upon the polarity of charge on the capacitor 82.

With the relay 1CR energized, several things happen. First, the charging circuit is interrupted because the contacts 1CR2 open. Secondly, a discharge circuit is established because the contacts 1CR1 close. Thirdly, the motor 32 is operated because the contacts 1CR4 close, and fourthly, the time delay unit 110 is energized because the contacts 1CR3 close.

The path taken with respect to the discharge of the capacitor 82 is through the resistor 88 and the portion 90a of the resistor 90, and the now closed contacts 1CR1. Consequently, the capacitor 82 begins to lose its charge at a rate determined by the amount of resistance contained in the resistor 88 and the portion 90a. When the capacitor 82 has been discharged to a particular level or datum, it follows that the relay amplifier no longer receives a sufficient voltage which is adequate to maintain the contacts RA1 closed. When this occurs, then the relay 1CR becomes deenergized and its contacts 1CR4 open to stop the motor 32. However, while the motor 32 has been running, the valve 26 has been actuated in a direction to open the valve and thereby supply a greater amount of liquid to the tank 14.

As more liquid is added to the tank 14, the float 38 begins to rise and moves the slidable contact 48 in a direction to reduce the magnitude of the error signal. If the valve operating motor were allowed to continue to increase the flow into the tank 14 until the error signal had been reduced to a minimum, it can be recognized that too much liquid might well have been added so that the desired liquid level is exceeded and the error signal increases in an opposite polarity direction. While the selected industrial apparatus 12 and the tank 14 are not completely representative of the versatility of the invention, it can be appreciated that in many industrial processes, an over control or over shoot would result if the corrective action were continued until the measured quantity or error signal were reduced to a minimum. It is one of the objects of the invention to prevent over controlling or over shooting.

Hence, when the relay 1CR is energized due to the phase sensitive relay amplifier RA sensing a sufficient voltage across the capacitor 82, the contacts 1CR3 are instrumental in starting the motor 112 of the time delay unit 110. The contacts 132 become closed fairly soon in order to assure continued operation of the motor 112 even though the contacts RA1 might open to thereby cause de-energization of the relay 1CR with a concomitant opening of its contacts 1CR3.

As the motor 112 continues to operate, the cam 122 causes closure of the contacts 136 and these contacts 136 remain closed for the rest of the cycle. Closing of the contacts 136 provides an electrical path between terminals 58 and 60 through only the resistor 84 so that the capacitor 82 cannot be recharged until the contacts 136 have reopened. Thus, a wait or delay is incorporated into the controller 10 which disables the controlling action for a time interval to give the system a chance to respond to the corrective action already taken. Assuming that the motor 112 operates at a constant speed, it follows that the gear box 116, by reason of the gear ratio, determines just how much time elapses before the capacitor 82 is again connected into the charging circuit. As long as the contacts 136 remain closed, no charging action can take place. Obviously, the time delay or wait will depend upon the characteristics of the valve, the tank or other particular process being controlled. In some instances, an extremely long time delay should be incorporated into the operation, whereas in other processes a relatively short delay can be used. In any event, the controller 10 provides only as many preestablished increments of control as may be effected by the repeated charging of the capacitor 82 to a predetermined state of charge during the portion of the cycle of timer 110 in which contacts 136 remain open. Furthermore, if the industrial apparatus 12 is at any given time taking varying amounts of liquid from the tank 14 and doing it within relatively short periods of time, the up and down movement of the float 38 and the resulting error signal applied across the terminals 58, 60 may have an alternating polarity, and capacitor 82 may seldom acquire a charge of one polarity and sufficient magnitude to operate the RA1 or RA2 contacts. Thus, relatively small or rapid changes will act to accumulate a charge on the capacitor 82 that is adequate to produce a corrective action related only to the more slowly varying trend of the error voltage, which, even in the presence of large noise, is negligibly small.

If the error signal is great or sustained, though, the capacitor 82 will become charged to a predetermined level and will, therefore, initiate another correcitve action via the motor 32. Due to the time delay unit 112, however, further corrective action cannot be reinitiated until the motor 112 has caused the cam 122 to rotate through a complete revolution.

From the above, it will be recognized that the corrective action has been such as to cause an increase in the flow of liquid 24 through the flow line 22. On the other hand, if the liquid 16 within the tank 14 rises sufficiently, a more positive error signal is applied to the terminal 58 and the capacitor 82 is charged in a reverse direction from that described above. This will result in closure of the contacts RA2 and operation of the relay 2CR with the consequence that the motor rotates in a direction to close the valve 26 and thereby reduce the quantity of liquid being added. The operation of the time delay unit 110 is the same in both instances.

It will be appreciated that the discharge path is different from that provided in the first instance, however, for here the discharge is through the resistor 88 and the portion 90b of the resistor 90. It will be recognized that the resistive values of the portions 90a and 90b need not necessarily be equal. By having an unsymmetrical relationship, the corrective action in one direction can be made more rapid than in an opposite direction, this being desirable in some processes.

It will, of course, be understood that various changes may be made in the form, details, arrangements and proportions of the parts without departing from the scope of my invention as set forth in the appended claims.

What is claimed:

1. An integrating controller comprising:
   (a) means for producing an integrated error signal;
   (b) means for preventing said integrated error signal from increasing beyond a certain upper value;

(c) means for decreasing said integrated signal to a certain lower value after reaching said upper value;

(d) means for causing a corrective action to occur in a direction to reduce the error that produced said integrated signal while said signal is decreasing, and (e) means for delaying the subsequent production of another integrated error signal until after said above-mentioned integrated signal has been decreased to its said lower value.

2. An integrating controller comprising:

(a) means for providing a signal the value of which is the integral of a function requiring corrective action;

(b) means responsive to said integral signal for initiating a corrective action when said integral signal reaches a given value and terminating said corrective action within a first period of time, and (c) means for preventing subsequent operation of said responsive means within a second period of time longer than said first period.

3. An integrating controller comprising:

(a) means for providing an electrical signal the magnitude of which is representative of an integrated quantity;

(b) means responsive to said electrical signal when said electrical signal has increased to a given magnitude for preventing a further increase in the magnitude of said signal;

(c) means for inactivating said first means for a predetermined period of time after said electrical signal has reached its said given value, and (d) means for reducing said electrical signal a predetermined amount within said predetermined time period so that a datum signal level exists in preparation for the reactivation of said signal providing means, (e) whereby said electrical signal must increase once again to its said given magnitude in order to cause operation of said responsive means.

4. An integrating controller comprising:

(a) means for integrating an error signal until a predetermined integral thereof has been obtained;

(b) means for then stopping the integration;

(c) means for starting a corrective action at the same time said integration is stopped;

(d) means for continuing said corrective action for a predetermined interval of time, and (e) means for delaying the starting of a subsequent integration for a predetermined interval of time longer than said first-mentioned interval.

5. An integrating controller in accordance with claim 4 in which:

(a) said error signal is in the form of a variable voltage having a magnitude at any given moment representative of the deviation of said error signal from a certain value, and (b) said integrating means includes a capacitor that is charged to a particular state to provide said predetermined integral.

6. An integrating controller in accordance with claim 5 in which:

(a) said means for continuing said corrective action includes a discharge circuit, the time taken to effect a discharging of said capacitor to a particular lower state of charge than said first-mentioned state determining said first-mentioned period of time.

7. An integrating controller comprising:

(a) means for providing an electrical signal which is the integral of an error signal representative of the degree of needed corrective action;

(b) means operated by said electrical signal when said electrical signal reaches a predetermined magnitude to start a corrective action period;

(c) time delay means operated by said second-mentioned means for starting a predetermined delay period for rendering ineffectual said first-mentioned means during said delay period, and (d) means for reducing the magnitude of said electrical signal to a predetermined lower magnitude during a period of time less than said delay period, (e) said second-mentioned means causing a termination of said corrective action period when said lower magnitude is reached.

8. An integrating controller in accordance with claim 7 in which:

(a) said first-mentioned means includes a capacitor which is charged to a predetermined level to provide said electrical signal, and (b) said time delay means includes a motor that is started when said second-mentioned means is operated and a cam-actuated switch for preventing further charging of said capacitor during said delay period.

9. An integrating controller comprising:

(a) a capacitor;

(b) means for charging said capacitor in accordance with the magnitude of an error signal representative of the amount of needed corrective action;

(c) a first discharge path for said capacitor;

(d) a second discharge path for said capacitor;

(e) means responsive to a predetermined level and polarity of charge on said capacitor for rendering effective either said first discharge path or said second discharge path depending upon the polarity of said charge to initiate a discharging of said capacitor;

(f) means for effecting a corrective action during each discharge period of said capacitor, and (g) means for preventing a recharging of said capacitor for a predetermined period which is longer than said discharging period.

10. An integrating controller in accordance with claim 9 in which:

(a) each of said discharge paths includes a variable amount of resistance.

References Cited by the Examiner
UNITED STATES PATENTS

| | | | |
|---|---|---|---|
| 2,608,678 | 8/1952 | Marchment et al. | 318—456 |
| 2,724,795 | 11/1955 | Rusler | 318—29 |
| 2,937,327 | 5/1960 | Vossberg | 318—28 X |

ORIS L. RADER, *Primary Examiner.*

JOHN F. COUCH, *Examiner.*

T. LYNCH, *Assistant Examiner.*